(12) United States Patent
Miyatake

(10) Patent No.: US 8,077,368 B2
(45) Date of Patent: Dec. 13, 2011

(54) OPTICAL SCANNING APPARATUS AND IMAGE FORMING APPARATUS

(75) Inventor: Naoki Miyatake, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 589 days.

(21) Appl. No.: 12/328,224

(22) Filed: Dec. 4, 2008

(65) Prior Publication Data

US 2009/0168132 A1  Jul. 2, 2009

(30) Foreign Application Priority Data

Dec. 27, 2007  (JP) ................... 2007-338026

(51) Int. Cl.
*G02B 26/08* (2006.01)

(52) U.S. Cl. ............... 359/204.1; 359/204.2; 359/205.1; 359/216.1

(58) Field of Classification Search .... 359/204.1–204.5, 359/216.1–219.2; 347/235, 250
See application file for complete search history.

(56) References Cited

U.S. PATENT DOCUMENTS

| | | | |
|---|---|---|---|
| 5,680,254 A | 10/1997 | Ueda et al. | |
| 6,317,245 B1 | 11/2001 | Hama et al. | |
| 6,396,615 B1 | 5/2002 | Hama et al. | |
| 6,476,955 B1 | 11/2002 | Yoshida | |
| 6,621,512 B2 | 9/2003 | Nakajima et al. | |
| 6,636,340 B1 | 10/2003 | Hama et al. | |
| 6,771,300 B2 | 8/2004 | Amada et al. | |
| 6,781,728 B2 | 8/2004 | Hama et al. | |
| 6,813,051 B2 | 11/2004 | Suzuki et al. | |
| 6,987,593 B2 | 1/2006 | Hayashi et al. | |
| 7,050,082 B2 | 5/2006 | Suzuki et al. | |
| 7,050,210 B2 | 5/2006 | Atsuumi et al. | |
| 7,088,484 B2 | 8/2006 | Hayashi et al. | |
| 7,161,724 B1 | 1/2007 | Miyatake | |
| 7,167,288 B2 | 1/2007 | Miyatake et al. | |
| 7,277,212 B2 | 10/2007 | Miyatake et al. | |
| 7,385,181 B2 | 6/2008 | Miyatake et al. | |
| 7,411,712 B2 | 8/2008 | Nakajima et al. | |
| 2004/0240000 A1 | 12/2004 | Miyatake et al. | |
| 2006/0203264 A1 | 9/2006 | Miyatake | |
| 2007/0002417 A1 | 1/2007 | Hirakawa et al. | |
| 2007/0030538 A1 | 2/2007 | Hirakawa et al. | |
| 2007/0216754 A1 | 9/2007 | Miyatake | |
| 2007/0297036 A1 | 12/2007 | Nakamura et al. | |
| 2008/0062491 A1 | 3/2008 | Nakamura et al. | |
| 2008/0068691 A1 | 3/2008 | Miyatake | |
| 2008/0180772 A1 | 7/2008 | Miyatake et al. | |
| 2008/0192319 A1 | 8/2008 | Miyatake et al. | |

FOREIGN PATENT DOCUMENTS

| | | |
|---|---|---|
| JP | 11-44857 | 2/1999 |
| JP | 11-157128 | 6/1999 |
| JP | 2001-4948 | 1/2001 |
| JP | 2001-10107 | 1/2001 |
| JP | 2001-350110 | 12/2001 |
| JP | 3295281 | 4/2002 |
| JP | 3444459 | 6/2003 |
| JP | 3851469 | 9/2006 |
| JP | 3920534 | 2/2007 |

*Primary Examiner* — James Phan
(74) *Attorney, Agent, or Firm* — Oblon, Spivak, McClelland, Maier & Neustadt, L.L.P.

(57) ABSTRACT

Synchronization detecting units detect synchronization signals by receiving the light beam deflected to one side of a light source on one side of an optical deflector and receiving the light beam deflected to an opposite side of an optical axis of a scanning optical system from the light source on the other side of the optical deflector. Photodetectors that detect the synchronization signals are arranged on the opposite side of an optical axis of a scanning optical system from the light sources and on a side closer to the scanning optical system that detects the synchronization signals by receiving the light beam deflected to the light source.

10 Claims, 6 Drawing Sheets

OPTICAL SCANNING APPARATUS AND IMAGE FORMING APPARATUS

CROSS-REFERENCE TO RELATED APPLICATIONS

The present application claims priority to and incorporates by reference the entire contents of Japanese priority document 2007-338026 filed in Japan on Dec. 27, 2007.

BACKGROUND OF THE INVENTION

1. Field of the Invention

The present invention relates to an optical scanning apparatus and an image forming apparatus that includes the optical scanning apparatus.

2. Description of the Related Art

An optical scanning apparatus is used in laser printers. A typical optical scanning apparatus is configured to deflect a light beam output by a light source with an optical deflector, form an optical spot on a scan target surface by focusing the deflected light beam on the surface using a scanning image-forming optical system, such as an f-theta lens, and scan the scan target surface with the optical spot. The scan target surface is usually a photosensitive surface of a photosensitive medium, such as a photoconductor.

In a typical full-color image forming apparatus, four photoconductors are arranged in the direction of feeding a recording sheet, and a deflecting unit is provided that deflects a flux of light beams emitted by a plurality of light sources corresponding to each of the photoconductors. A plurality of scanning image-forming optical systems corresponding to each of the photoconductors exposes the photoconductors at the same time to form latent images corresponding to single colors. The single-color latent images are then made visible by a developing unit using developers of different colors such as yellow, magenta, cyan, and black. The single-color visible images are then transferred onto a single recording sheet and fixed thereby obtaining a full-color image. Such an image forming apparatus that forms a two-color image, a multicolor image, or a color image using at least two sets of the optical scanning apparatus and the photoconductors is known as a tandem image forming apparatus.

Some tandem image forming apparatuses include a single optical deflector shared by a plurality of the photosensitive media. A so-called opposing scanning method of inputting a flux of light beams from opposite sides of the optical deflector and spreading the flux for scanning is disclosed in Japanese Patent Application Laid-open No. H11-157128 and Japanese Patent Application Laid-open No. H9-127443. Another method of inputting a plurality of virtually parallel fluxes apart from one another in the sub scanning direction and arranging a plurality of scanning optical systems corresponding to the fluxes in the sub scanning direction for scanning is disclosed in Japanese Patent Application Laid-open No. H9-54263. Still another method of inputting the flux from one side of the optical deflector and scanning with a set of three scanning optical systems is disclosed in Japanese Patent Application Laid-open No. 2001-4948, Japanese Patent Application Laid-open No. 2001-10107, and Japanese Patent Application Laid-open No. 2001-33720. In this method, a plurality of fluxes that fall on different scan target surfaces pass through two of the scanning optical lenses, and a remaining lens is provided with respect to each scan target surface.

If the optical deflector is shared by a plurality of the scan target surfaces, the number of the optical deflector is reduced, and therefore the size and the production cost of the image forming apparatus can be also reduced. In these years, the size reduction of the image forming apparatus has been accelerated, and reduction of the size and the production cost of the optical scanning devices used in the image forming apparatus is demanded.

To save the production cost and footprint, it is desired to use a photodetector that detects synchronization signals at one of a start point of drawing and an end point of drawing (hereinafter, "one-point synchronization"). With the one-point synchronization, not only the production cost of the synchronization detecting units can be reduced, but also the electrical control system can be simplified.

However, to provide the synchronization detecting units in addition to the scanning optical systems in the opposing scanning method, if they are arranged symmetrically, a light on one side is disadvantageously apt to interfere with a light source board 32 that holds a light source 33 as indicated by a dotted circle shown in FIG. 7.

To avoid interference, the light source 33 can be arranged away from the light source board 32; however, the size of the optical scanning apparatus is made larger. Alternatively, many reflecting mirrors 39 can be used to avoid the interference. However, it is difficult to spare a space for the reflecting mirrors 39, and a synchronization beam can depart from a photodetector due to accumulation of tilts of the reflecting mirrors 39. Furthermore, increase of the optical systems causes degradation of the optical performance and cost increase. In this manner, use of many reflecting mirrors 39 is disadvantageous for reduction of the size and the production cost, and degrades detecting accuracy at the same time.

In FIG. 7, reference numeral 34 denotes a coupling lens, 35 denotes a cylindrical lens, 38 denotes a synchronization lens, and 40 denotes a photodetector.

It is also possible to reflect the light by the reflecting mirror 39 so that the synchronization detecting units are arranged away from a scanning lens 36. However, in fact, a reflecting mirror that reflects the light in the sub scanning direction to conduct the light onto a scan target surface 7, i.e. the photoconductor, is arranged at a close position opposite of a polygon mirror (i.e., an optical deflector) 31 of the scanning lens 36, and therefore the reflecting mirror is apt to interfere with the synchronization detecting unit.

Another way is providing the synchronization detecting units without using the reflecting mirrors as shown in FIG. 8. However, the focal length of the synchronization detecting unit in the sub scanning direction is remarkably shorter than that of the scanning optical system, which amplifies an error of synchronization detection at the time of drawing, resulting in degradation of accuracy of the synchronization detection.

If the synchronous optical path is made longer without using the reflecting mirrors, the optical scanning apparatus is made larger. To extend the synchronous optical path and reduce the size of the optical scanning apparatus at the same time, there is a need of bending the optical path in the direction orthogonal to the optical axis of the scanning optical system using the reflecting mirror, which causes the same problem as described above.

To meet the demand for the reduction of the size and the production cost of the optical scanning apparatus, one of possible approaches is to configure the scanning optical systems with one lens instead of two lenses, which is common. If the optical scanning apparatus includes a single smaller lens arranged as close to the optical deflector as possible, the footprint and the production cost will be greatly reduced. On the other hand, though it is less effective to reduce the size and the production cost, even if two scanning lenses are used to obtain desired optical performance, an equivalent effect can be obtained by arranging one of the scanning lenses as close to the optical deflector as possible. However, to arrange the scanning lens closer to the optical deflector, the light beam for synchronization needs to pass through the scanning lens, and there is a risk of a large misalignment of a scanning point in the main scanning direction accompanying the change of temperature.

An example of the scanning optical system including a single scanning lens based on the one-point synchronization is disclosed in Japanese Patent Application Laid-open No. H11-44857. However, the light beam directed to synchronization passes through the scanning lens, and therefore, in the case of temperature change, the scanning point is misaligned in the main scanning direction at the point of the synchronization due to the deformation of the scanning lens. The misalignment is not remarkable in monochrome scanning as in Japanese Patent Application Laid-open No. H11-44857. However, the single scanning lens based on the one-point synchronization cannot be employed in color scanning, especially in the opposing scanning method, because the scanning directions of opposing scanning optical systems are opposite in the main scanning direction, the misalignment appears a color shift, which drastically lowers the image quality.

A known example of the scanning optical systems that employs the opposing scanning method based on the one-point synchronization is disclosed in Japanese Patent Application Laid-open No. H11-44857. However, the light beam directed to the synchronization detecting unit passes through the scanning lens, and therefore, in the case of temperature change, the scanning point is misaligned in the main scanning direction at the point of the synchronization due to the deformation of the scanning lens. Furthermore, because the synchronization beam is reflected after passing through the two scanning lenses, it is hard to configure the optical scanning apparatus when a reflecting mirror in the sub scanning direction is provided in an actual drawing apparatus. There will be a need of either deflecting the light beam also in the sub scanning direction with more reflecting mirrors for the synchronization beam or increasing the size of the optical scanning apparatus to prevent interference with other optical systems. As described above, therefore, the opposing scanning method based on the one-point synchronization is disadvantageous for reduction of the size and the production cost, and degrades detecting accuracy.

SUMMARY OF THE INVENTION

It is an object of the present invention to at least partially solve the problems in the conventional technology.

According to an aspect of the present invention, there is provided an optical scanning apparatus including a plurality of light sources each of which emits a light beam to scan a corresponding one of a plurality of scan target surfaces; an optical deflector having a plurality of deflecting-reflecting surfaces each of which deflects a corresponding one of the light beams emitted by a corresponding one of the light sources; a plurality of scanning optical systems each of which focuses a corresponding one of the light beams onto a corresponding one of the scan target surfaces, the light sources being arranged on same side of optical axes of all the scanning optical systems; and a synchronization detecting unit that receives a synchronization signal from one of a start point and an end point of scanning with the light beam on the scan target surfaces. The synchronization detecting unit receiving one of a light beam that is deflected by the optical deflector toward same side of an optical axis of a corresponding one of the optical scanning systems as that of a corresponding one of the light sources, and a light beam that is deflected by the optical deflector toward an opposite side of an optical axis of a corresponding one of the scanning optical systems with respect to a corresponding one of the light sources. Moreover, the synchronization detecting unit including a photodetector that detects the synchronization signal, the photodetector being arranged on an opposite side of the optical axis of the scanning optical systems for which the synchronization detecting unit receives a light beam that is deflected by the optical deflector toward the same side as that of the corresponding one of the light sources.

According to another aspect of the present invention, there is provided an image forming apparatus including the above optical scanning apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

Figure 1:
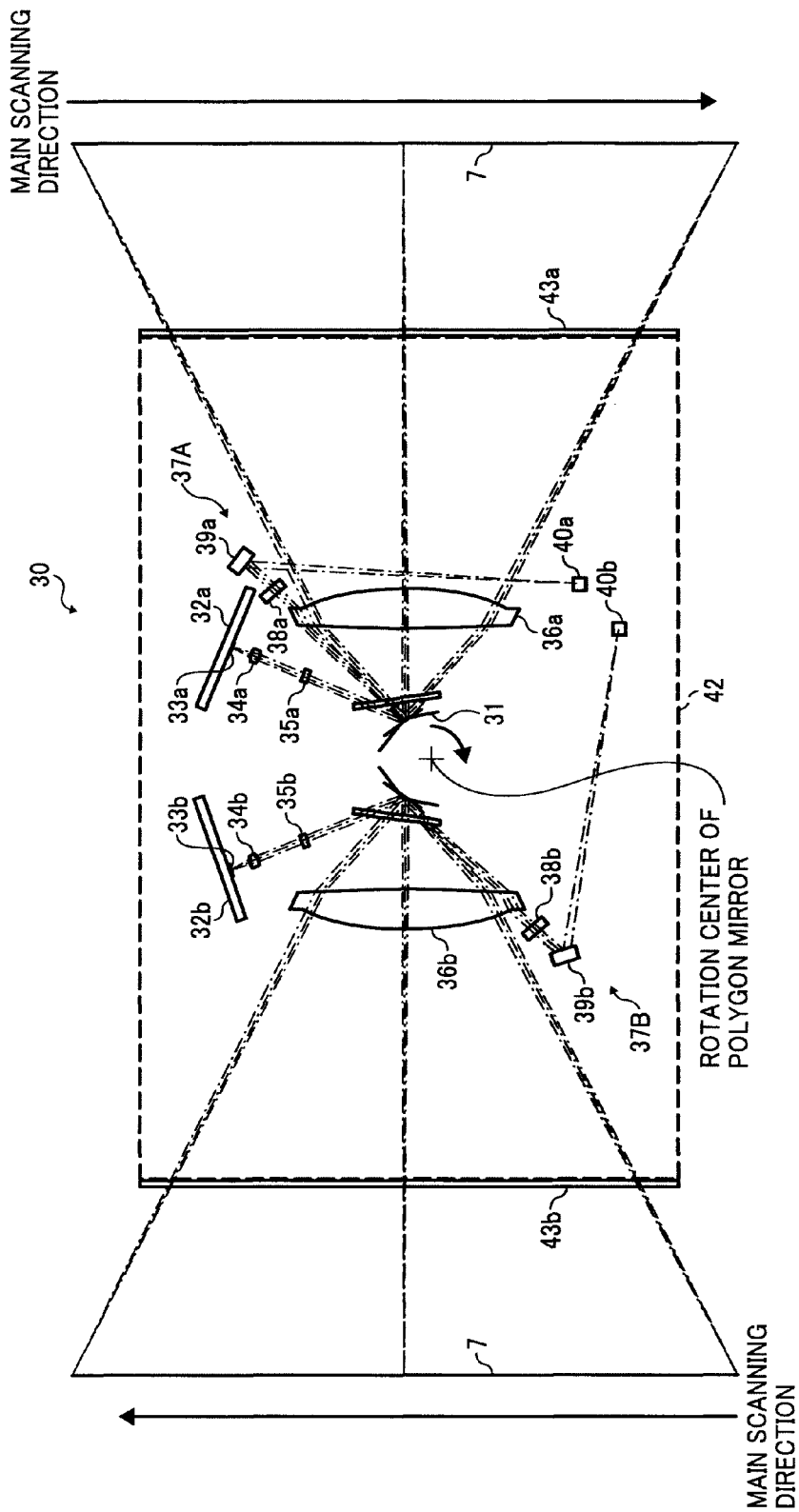
FIG. 1 is a schematic diagram of an optical scanning apparatus according to a first embodiment of the present invention.

FIG. 1 is a schematic top view of an optical scanning apparatus 30 according to a first embodiment of the present invention in a plane that includes the main scanning direction. The optical scanning apparatus 30 includes a polygon mirror 31 that is used as an optical deflector, and two scanning optical systems, one on the right side and the other on the left side of the polygon mirror 31.

Only the configuration on the right side will be explained below; because the configuration on the left side almost the same. A reference numeral of each constituent on the right side has A or a at the end, and a reference numeral of each constituent on the left side has B or b at the end, for distinction purpose.

A semiconductor laser 33a as a light source is arranged on a light source board 32a. The semiconductor laser 33a emits a diverging flux, and a coupling lens 34a converts the flux into a shape of the flux suitable for later optical systems. The coupling lens 34a can have a configuration that makes it possible for the coupling lens 34a to convert the flux into a parallel flux, a slightly diverging flux, or a slightly converging flux.

The flux output from the coupling lens 34a enters into a cylindrical lens 35a in the sub scanning direction, and subsequently falls on a deflecting-reflecting surface of the polygon mirror 31. The flux is then reflected from the deflecting-reflecting surface and it is subsequently deflected at a constant angular velocity of a constant rotation of the polygon mirror 31. The flux then passes through a scanning lens 36a, i.e. a scanning optical system, and a dust-proof glass 43a, and falls on a scan target surface 7. The flux forms an optical spot on the scan target surface 7, and the scan target surface 7 is scanned with this optical spot. A reflecting mirror that is arranged in an optical path between the polygon mirror 31 and the scan target surface 7 to guide the flux to the scan target surface 7 is not shown in FIG. 1.

A synchronization detecting unit 37A that detects synchronization signals, which is a synchronization detecting unit, includes a synchronization lens 38a, a reflecting mirror 39a, and a photodetector 40a. After being deflected from the deflecting-reflecting surface of the polygon mirror 31, the flux passes through an end of the scanning lens 36a and the synchronization lens 38a, deflected by the reflecting mirror 39a in the main scanning direction and finally enters into the photodetector 40a in a desired shape of a beam spot.

Thus, the scanning optical system on the right side includes a single scanning lens 36a. It is preferable that the scanning lens 36a be arranged close to the polygon mirror 31 to reduce the production cost and a footprint. By arranging the scanning lens 36a close to the polygon mirror 31, the scanning lens 36a can be made smaller in the main scanning direction, which leads to cost reduction.

Figure 2:
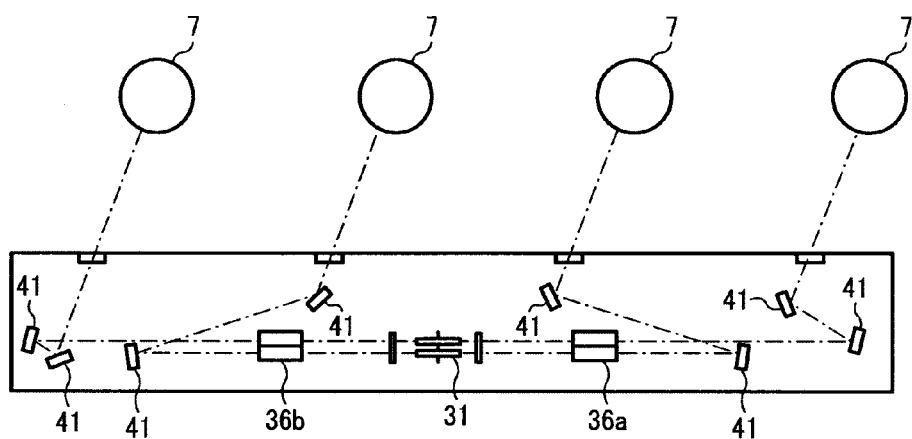
FIG. 2 is a schematic diagram illustrating an arrangement of reflecting mirrors shown in FIG. 1 with respect to photoconductors shown in FIG. 1.

Furthermore, when the light beam is reflected in the sub scanning direction as shown in FIG. 2 to be directed to a corresponding scan target surface after passing through the scanning lens 36a, the closer to the polygon mirror 31 the scanning lens 36a is, the closer to the polygon mirror 31 a mirror 41 can be, which leads to reduction in the overall size of the optical scanning apparatus.

Although a single scanning lens is used in the first embodiment, two scanning lenses can be arranged near the polygon mirror 31. However, a single scanning lens is more advantageous from the viewpoint of reduction in the production cost and the size.

Returning to FIG. 1, a detailed explanation of the synchronization detecting unit 37A and a synchronization detecting unit 37B is given below. After passing through a corresponding one of the scanning lens 36a and a scanning lens 36b, the light beam passes through a corresponding one of the synchronization lens 38a and a synchronization lens 38b. The light beam is then reflected by a corresponding one of the reflecting mirror 39a and a reflecting mirror 39b to be led to a side opposite to its light source on the right side in FIG. 1, where a synchronization beam deflected to the light source is present, and it is finally detected by a corresponding one of the photodetector 40a and a photodetector 40b. The synchronization lenses 38a and 38b focuses the light beam onto the photodetectors 40a and 40b.

In an optical box 42 that houses therein optical elements, there is an extra space on the opposite side of the light source. When one of the synchronization beams in the optical systems on both sides of the polygon mirror 31 detects one of a start point and an end point of drawing, the light beam deflected to the light source detects the start point or the end point on the right side of FIG. 1, and the light beam deflected to the opposite side of the light source detects the end point or the start point o the left side of FIG. 1, in synchronization. At this time, the synchronization beam on the right side is reflected to the opposite side of the light source, and the synchronization beam on the left side is reflected to right of the polygon mirror 31 beyond the polygon mirror 31. In this manner, the photodetectors 40a and 40b can be arranged so that the optical path lengths become virtually equal.

It is desired that the reflecting mirror 39a and 39b are arranged immediately behind the scanning lens 36a and 36b closest to the polygon mirror 31. With a single scanning-lens configuration, the reflecting mirrors 39a and 39b are arranged immediately behind the scanning lenses 36a and 36b.

Because the scanning lenses 36a and 36b are arranged near the polygon mirror 31 to reduce the size of the optical scanning apparatus, it is hard to separate the synchronization beam between each of the scanning lenses 36a and 36b and the polygon mirror 31. Furthermore, if the synchronization beam is close to the polygon mirror 31, a distance between the synchronization beam and a drawing beam lead to a photoconductor by the scanning optical system in the main scanning direction is so short that the separation becomes difficult. On the other hand, to separate the synchronization beam near the scan target surface 7, there are many reflecting mirrors 41 in the sub scanning direction as shown in FIG. 2, and therefore it is hard to arrange the photodetectors 40a and 40b and the reflecting mirrors 39a and 39b.

By making the optical path length virtually equal, the synchronization detecting units on both sides can share a single synchronization lens instead of the separate synchronization lenses 38a and 38b, which focuses the synchronization beam onto the photodetectors 40a and 40b. As explained later, it is desired that the reflecting mirrors 39a and 39b and the photodetectors 40a and 40b are in a conjugate relation in the sub scanning direction. For this purpose, it is desired to make the optical path lengths of the synchronization detecting units virtually equal, arrange the reflecting mirrors 39a and 39b at virtually same positions, and arrange the synchronization lenses 38a and 38b at virtually same positions, thereby sharing the elements, in view of both production cost and designing.

With the configuration according to the first embodiment, the optical path of the synchronization detecting unit can be made longer, and therefore a focal length of the synchronization detecting unit in the main scanning direction can get close to the focal length of the scanning optical system in the main scanning direction.

If the focal length of the synchronization detecting unit in the main scanning direction is substantially shorter than the focal length of the scanning optical system in the main scanning direction, the speed of scanning the photodetector 40a or 40b is slower than the speed of scanning the scan target surface 7, which causes a displacement of the start point of drawing. In other words, an error detected by the photodetector 40a or 40b is enlarged at the start point on the scan target surface 7. As a result, in the opposing scanning method, the start points of the opposing optical systems are reverse, and therefore a color shift occurs when a plurality of images are superposed, resulting in degradation of the image quality.

However, according to the first embodiment, in the optical system based on the opposing scanning method, the synchronization detecting unit can be arranged without increasing the size of the optical box 42, and the optical path can be made longer, thereby improving the accuracy of the synchronization detection.

Furthermore, the number of the reflecting mirrors 39a and 39b can be minimized to one on each side, which supports the cost reduction. Moreover, by setting the reflecting mirrors 39a and 39b at an optimal angle, a single photodetector can replace the photodetectors 40a and 40b, thereby further reducing the production cost.

However, because the synchronization beam enters slightly angled in the main scanning direction, the diameter of the light beam spot in the main direction increases, resulting in a slight degradation of the detection accuracy. To prioritize the optical performance, it is desired to provide the separate photodetectors 40a and 40b in both optical systems as described above.

Obviously, in an optical scanning apparatus for four colors of black, cyan, magenta, and yellow, two colors each on the left side and the right side can share the reflecting mirror 39a or 39b, the synchronization lens 38a or 38b, and the photodetector 40a or 40b.

The light beam is focused on the photodetectors 40a and 40b only in the main scanning direction. If the light beam is not focused in the main scanning direction, the accuracy of detecting the light beam that crosses the photodetectors 40a and 40b degrades. On the other hand, if the light beam is focused in the sub scanning direction, there is a risk of a detection error due to an influence by dust on the photodetector or the like, thereby degrading the detection accuracy.

In the sub scanning direction, the detection can be performed even if there is dust, by making the light beam diameter, for example, one millimeter. Because an effective area of the photodetector 40a and 40b in the sub scanning direction is generally two to three millimeters, the one-millimeter beam does not scatter. The diameter of the light beam spot in the sub scanning direction can be set so that the light beam does not scatter. To set the diameter, there is no need of reducing the diameter of the light beam spot to tens of micrometers.

Figure 3:
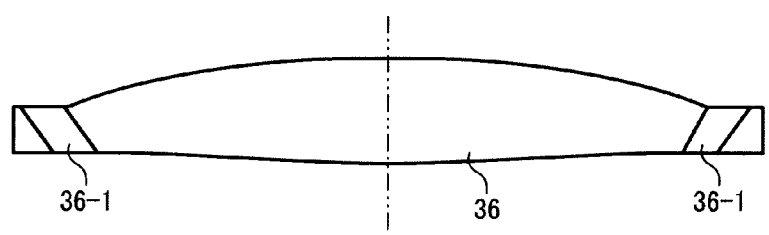
FIG. 3 is a side view of a scanning lens shown in FIG. 1.

A scanning lens 36 according to the first embodiment, which is used as one of the scanning lenses 36a and 36b, has a form as shown in FIG. 3. The light beam directed to the synchronization detecting unit passes through areas 36-1 at both ends, which is formed by a surface that does not have refractive power in the main scanning direction.

The synchronization signal is arranged only at the start point of drawing, thereby realizing the reduction of the footprint and the production cost. If a conventional lens is used in the optical scanning apparatus according to the first embodiment, the light beam directed to the synchronization detecting unit passes through the scanning lens having the refractive power in the main scanning direction, like the drawing beam directed to a photoconductor. At this time, the scanning point changes even at the synchronization point due to the change of the refractive index of the scanning lens, the shape of the scanning lens, and the wavelength of the laser diode caused by the temperature change.

Figure 4:
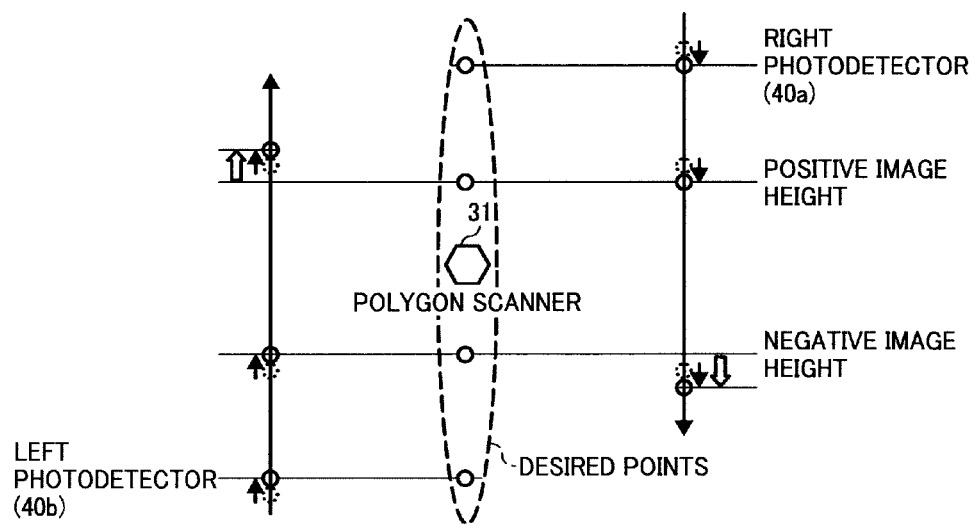
FIG. 4 is a schematic diagram for explaining how scanning points shift when the temperature increases in a one-point synchronization configuration using a conventional scanning lens.

FIG. 4 is a schematic diagram for explaining how scanning points shift when the temperature increases in the one-point synchronization configuration using the conventional scanning lens. For a simpler explanation, the shift of the start point and the end point of drawing on a photodetector in the main scanning direction is explained.

Circles surrounded by a dotted circle at the center of FIG. 4 are desired main scanning points of the light beam. Dotted circles indicate the main scanning points when the temperature increases. Expansion of the scanning lens due to temperature decreases the refractive power in the main scanning direction.

This means that the scanning points move toward the periphery of an image height. Because the timing of starting drawing is determined by the synchronization signal at a desired interval, the scanning point in the main scanning direction is corrected to the point indicated by a solid circle at the start point where the scanning point shifts in the same direction as the photodetector.

On the other hand, at the end point, the direction of correction by the synchronization is different from the direction of shifting the main scanning point due to the temperature change, and therefore the shift in the main scanning direction is larger. In other words, if the one-point synchronization is employed using the conventional scanning lens, the scanning point substantially shifts at the end point.

In the opposing scanning method in which the scanning optical systems are arranged on the left side and the right side of the polygon mirror 31 as shown in FIG. 1, the scanning directions of the right and left scanning optical systems are switched. When a color image is obtained by superposing the images drawn by the left and right scanning optical systems, the start points of drawing are different, and therefore the images are substantially misaligned in the main scanning direction. As a result, colors are shifted in an output image, which substantially degrades the image quality.

According to the first embodiment, the scanning lens 36a and 36b are positioned so that the light beam directed to the synchronization detecting units 37A and 37B pass through them, and the scanning lens 36a and 36b are formed with a surface that does not have the refractive power in the main scanning direction. Therefore, even when the temperature changes, the scanning points do not shift in the main scanning direction on the photodetectors 40a and 40b that receive the synchronization signals. Because the synchronization lenses 38a and 38b that configure the synchronization detecting units for the light beam after passing through the scanning lens are arranged so that the light beam passes through the optical axis, the scanning position does not shift.

Figure 5:
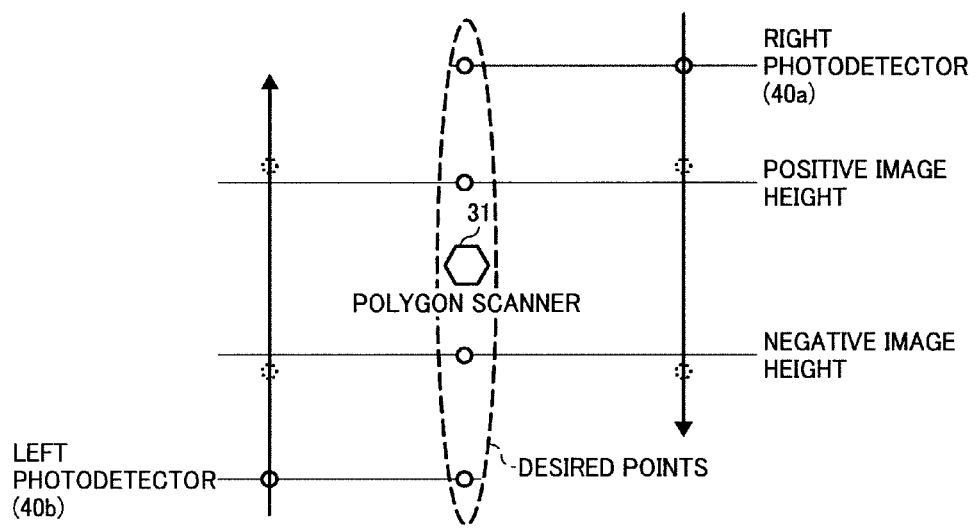
FIG. 5 is a schematic diagram for explaining how scanning points shift when the temperature increases in the optical scanning apparatus according to the first embodiment.

FIG. 5 is a schematic diagram for explaining how scanning points shift when the temperature increases in the one-point synchronization configuration using the scanning lenses 36a and 36b according to the first embodiment. At the synchronization point, the scanning point does not shift in the main scanning direction, as explained above. The scanning point shifts in the main scanning direction at the start point and the end point to the positions indicated by the dotted circles due to the expansion of the scanning lens 36a and 36b or the like.

However, in the opposing scanning method, the relative shifts in the main scanning direction at the start point and the end point match even if the scanning directions are reversed in the left and right scanning optical systems. Therefore, when the color image is obtained by superposing the images drawn by the left and right scanning optical systems, there is little risk of the color shift. As a result, a high-quality image with little color shift can be obtained.

The same effect as described above is achieved, when the optical system uses a multi-beam light source to emit beams directed to an identical scan target surface. For example, if the wavelengths of the light beams emitted by the multi-beam light source vary, the main scanning points also vary depending on the wavelength, as with the temperature change.

With the refractive power in the main scanning direction like the conventional scanning lens, the main scanning points are different among the multi beams on the photodetector due to the wavelength difference, and therefore the main scanning position substantially shifts at the end point. As a result, the end point of each scanning line varies, in addition to the color shift. On the actual image, vertical lines fluctuate, which degrades the image quality.

If there is no refractive power in the area of the scanning lens 36a or 36b where the light beam directed to the synchronization detecting unit 37A or 37B passes, the main scanning point does not shift on the photodetector as explained with reference to FIG. 5, and therefore a shift amount of the main scanning point among the multi beams can be reduced. In other words, though the main scanning points shift due to the difference of the wavelength, the amount of the shift is reduced. It is preferable to use a laser diode array that has a constant beam interval as the multi-beam light source. Alternatively, common laser diodes can be combined to be used as the multi-beam light source.

The synchronization detecting unit 37A or 37B preferably includes at least one reflecting mirror 39a or 39b to make a long optical path. By using the reflecting mirror 39a or 39b, the size of the optical box 42 can be made smaller and the optical path can be longer at the same time. An explanation about the optical path will be made later.

Although the size of the optical box 42 can be made smaller by using the reflecting mirror 39a or 39b, the fluctuation of the scanning position on the photodetector 40a or 40b in the sub scanning direction substantially increases due to a tilt of the reflecting mirror 39a or 39b in the sub scanning direction. As a result, the light beam misses a receiving surface of the photodetector 40a or 40b, timing of signals output from the photodetector 40a or 40b changes as the light intensity changes, and the timing of starting writing fluctuates.

To reduce such a fluctuation, according to the first embodiment the reflecting mirror 39a or 39b and the photodetector 40a or 40b are in a virtually conjugate relation. In this manner, even if the reflecting mirror 39a or 39b tilts, the synchronization lens 38a or 38b reduces the shift on the photodetector 40a or 40b in the sub scanning direction. As a result, the photodetectors 40a and 40b and the synchronization detecting units 37A and 37B are disposed in the optical box 42, the light beam always enter the receiving surface of the photodetectors 40a and 40b, and the shift of the light beam in the sub scanning direction due to the tilt of the reflecting mirror 39a or 39b can be reduced.

When many reflecting mirrors 39a and 39b are used, accumulated tilts of the mirrors in the sub scanning direction cannot be conjugated between the surface of the mirror and the photodetector as explained above, resulting in a large shift of the light beam in the sub scanning direction. On the contrary, a short optical path is disadvantageous as described later, and therefore it is desirable to make the optical path as long as it can be made with a single reflecting mirror.

In the optical scanning apparatus according to the first embodiment, the area of the scanning lenses 36a and 36b where the light beam directed to the synchronization detecting units 37A and 37B does not have the refractive power in the main scanning direction. Therefore, either one of the synchronization detecting units 37A and 37B needs to include the synchronization lens 38a or 38b having the refractive power in the main direction.

It is preferable to arrange the synchronization lenses 38a and 38b away from the photodetectors 40a and 40b. In other words, it is preferable that the lens having the refractive power in the main scanning direction is arranged at a position closest to the polygon mirror. This makes it possible to set the focal length of the synchronization detecting unit in the main scanning direction longer, which is close to the focal length of the scanning lens for drawing in the main scanning direction.

If the focal length of the synchronization detecting unit in the main scanning direction is substantially shorter than the focal length of the scanning optical system in the main scanning direction, the speed of scanning the photodetector is slower than the speed of scanning the scan target surface, which causes the shift of the start point. That is, the detection error of the photodetector is enlarged at the start point of drawing on the scan target surface. As a result, in the opposing scanning method, the start points of the opposing optical systems are reverse, and therefore a color shift occurs when a plurality of images are superposed, resulting in degradation of the image quality. Therefore, it is preferable that the synchronization detecting unit includes a single reflecting mirror disposed to save the footprint, that the reflecting mirror and the photodetector are in a virtually conjugate relation, that the synchronization lens having the refractive power in the sub scanning direction is provided to focus the light beam on the photodetector in the sub scanning direction with a desired size of the light beam spot, and that the synchronization lens having the refractive power in the main scanning direction is provided near the polygon mirror, i.e., immediately after the light beam passing through the scanning lens. The surface of the scanning lens where the light beam passes can be configured to have the refractive power in the sub scanning direction, and it can be configured to focus the light beam like the synchronization lenses 38a and 38b.

Figure 6:
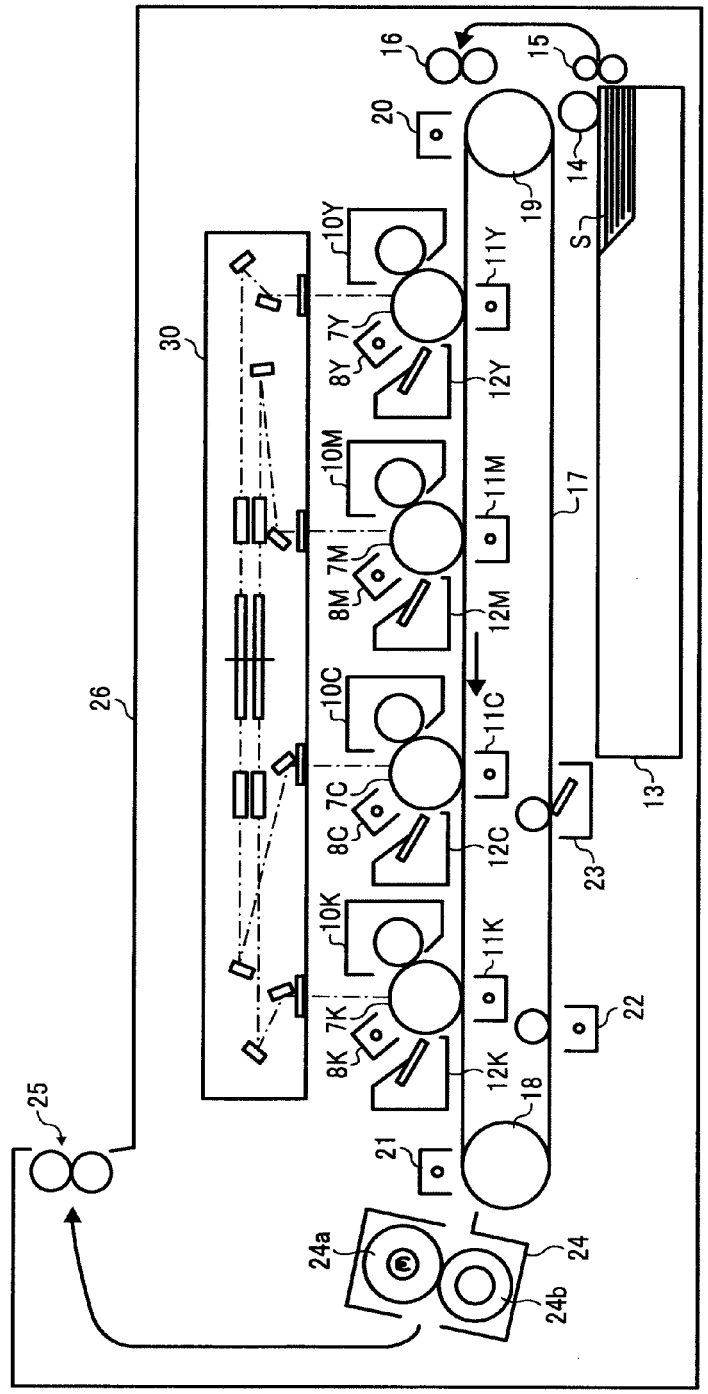
FIG. 6 is a schematic diagram of an image forming apparatus according to a second embodiment of the present invention.
Figure 7:
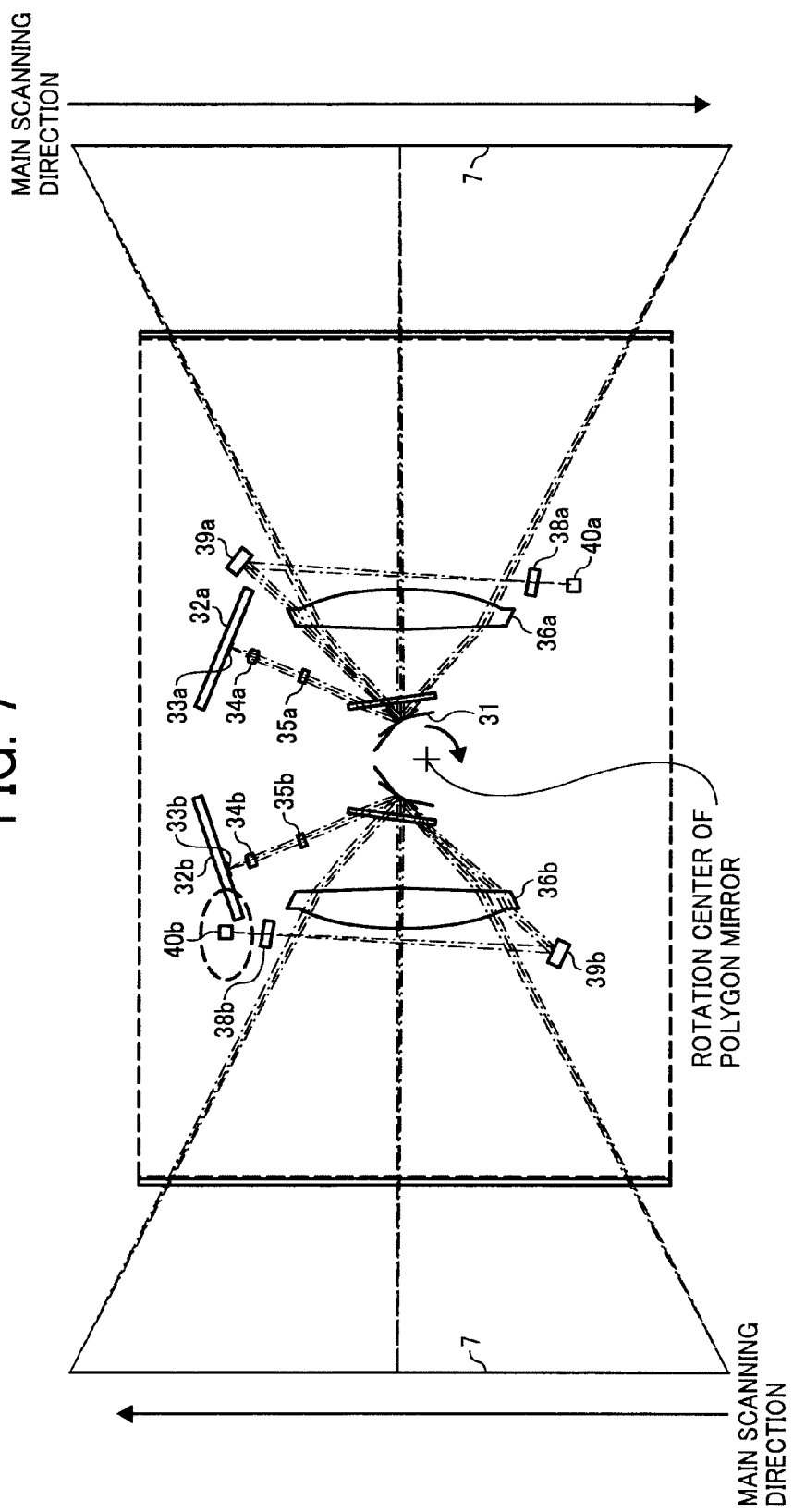
FIG. 7 is a schematic diagram of an optical scanning apparatus that employs a conventional opposing scanning method.
Figure 8:
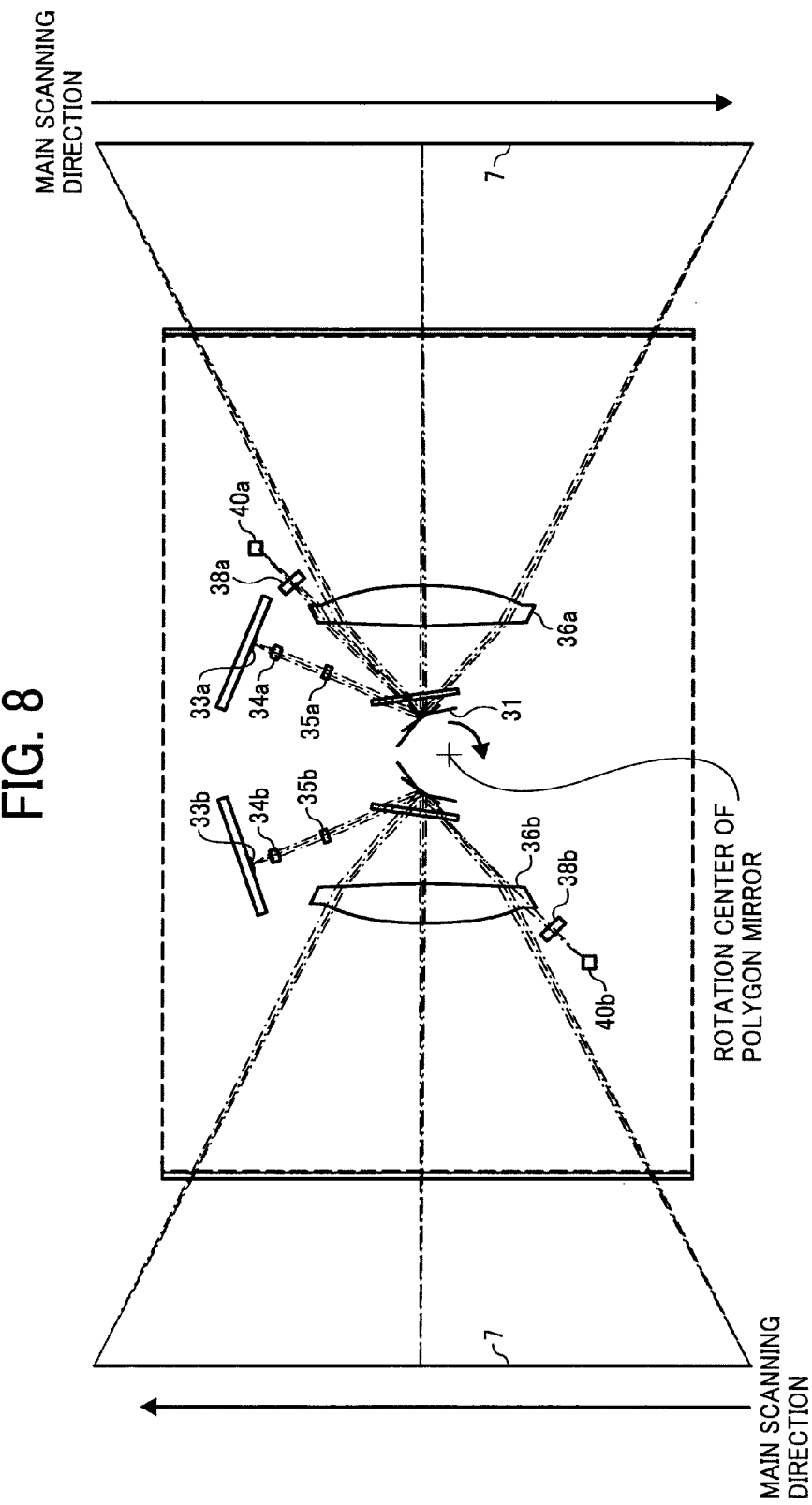
FIG. 8 is a schematic diagram of an optical scanning apparatus that employs a conventional opposing scanning method without using a reflecting mirror as a synchronization detecting unit.

Given below is an explanation of an image forming apparatus according to a second embodiment of the present invention with reference to FIG. 6. The image forming apparatus is a tandem full-color laser printer and includes the optical scanning apparatus 30.

The image forming apparatus includes a conveyance belt 17 in a lower section of the image forming apparatus, which conveys a printing sheet (not shown) fed by a paper tray 13 disposed in the horizontal direction. Above the conveyance belt 17, a photoconductor 7Y that holds a latent image in yellow, a photoconductor 7M in magenta, a photoconductor 7C in cyan, and a photoconductor 7K in black are arranged at an equal interval in the order from the upstream of the printing sheet conveyance. Each numeral reference has a letter Y, M, C, or K at the end for color distinction, as needed.

The photoconductors 7Y, 7M, 7C, and 7K are formed with the same diameter, with processing members that perform a corresponding process according to an electrophotographic process provided around them. For example, provided around the photoconductor 7Y are a charger 8Y, an optical scanning apparatus 30Y, a developing unit 10Y, a transfer charger 11Y, and a cleaning unit 12Y, in the order. The other photoconductors 7M, 7C, and 7K are provided with the same members.

In the image forming apparatus according to the second embodiment, the surfaces of the photoconductors 7Y, 7M, 7C, and 7K are used as the scan target surfaces in the corresponding color, and the photoconductors 7Y, 7M, 7C, and 7K are respectively provided with the optical scanning apparatuses 30Y, 30M, 30C, and 30K. However, the scanning lens is shared by four colors.

Around the conveyance belt 17, a paper stop roller 16 and a belt charger 20 are disposed on the upstream side of the photoconductor 7Y, and a belt separation charger 21, a discharger 22, and a cleaning unit 23 are disposed on the downstream side of the photoconductor 7K. A fixing unit 24 is provided on the upstream side of the belt separation charger 21, which leads to a copy receiving tray 26 via a delivery roller 25.

With such a configuration as described above, for example, in a full color mode, the optical scanning apparatus 30 scans each one of the photoconductors 7Y, 7M, 7C, and 7K with the light beam based on an image signal for the corresponding color, thereby forming a static latent image on the photoconductors 7Y, 7M, 7C, and 7K in the respective colors. Each of the static latent images is developed into a toner image by the corresponding developing unit with color toner. The toner images are superposed by being sequentially transferred onto the printing sheet electrostatically adsorbed by the conveyance belt 17, thereby forming a full color image on the printing sheet. The full color image is fixed by the fixing unit 24, and output to the copy receiving tray 26 by the delivery roller 25.

By using the optical scanning apparatus 30, the image forming apparatus effectively corrects the shift of the scanning line and the degradation of the wavefront aberration, thereby reproducing a high-quality image without the color shift.

According to an aspect of the present invention, it is possible to provide an optical scanning apparatus and an image forming apparatus including the optical scanning apparatus that can reduce the size and the production cost, and that can provide high optical performance.

Furthermore, it is possible to provide an optical scanning apparatus and an image forming apparatus including the optical scanning apparatus that allow little shift of the scanning point in the main scanning direction due to the temperature change and little shift among the colors, and that can provide high optical performance.

Moreover, the optical box can contain the synchronization detecting unit and the photodetector accurately.

Furthermore, it is possible to reduce the color shift and suppress the degradation of the resolution, thereby realizing a high-quality color image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising:
a plurality of light sources each of which emits a light beam to scan a corresponding one of a plurality of scan target surfaces;
an optical deflector having a plurality of deflecting-reflecting surfaces, the light beams from the light sources being reflected by different deflecting-reflecting surfaces;
a plurality of scanning optical systems each of which focuses a corresponding one of the light beams onto a corresponding one of the scan target surfaces, the light sources being arranged on same side of optical axes of all the scanning optical systems; and
a plurality of synchronization detecting units, each of which detects a synchronization signal regarding one of a start point and an end point of scanning with one of the light beams on one of the scan target surfaces, wherein
one of the synchronization detecting units detects the synchronization signal by receiving a light beam that is deflected by the optical deflector toward a side, which is the same as the side on which a corresponding one of the light sources is arranged, of a corresponding one of optical axes of a corresponding one of the optical scanning systems,
another of the synchronization detecting units detects the synchronization signal by receiving a light beam that is deflected by the optical deflector toward a side, which is opposite to the side on which a corresponding one of the light sources is arranged, of a corresponding one of the optical axes of a corresponding one of the scanning optical systems, and
each of the synchronization detecting units includes a photodetector that detects the synchronization signal, each photodetector being arranged on a side, which is opposite to the side on which the light sources are arranged, of a corresponding one of the optical axes of a corresponding one of the scanning optical systems.

2. The optical scanning apparatus according to claim 1, wherein
each of the scanning optical systems includes a scanning lens, the light beam towards the synchronization detecting unit passes through at least one of the scanning lenses, and an area of the scanning lens where the light beam passes through does not have refractive power at least in a main scanning direction.

3. The optical scanning apparatus according to claim 1, wherein the light beams directed to a same scan target surface is output from either a plurality of light sources or a multi-beam light source that includes a plurality of luminous points.

4. The optical scanning apparatus according to claim 1, wherein the photodetector is shared by the synchronization detecting units arranged on opposite sides of the optical deflector.

5. The optical scanning apparatus according to claim 1, wherein
the synchronization detecting unit includes at least one lens that focuses the light beam deflected by the optical deflector on the photodetector, and
the lens closest to the optical deflector has a strongest refractive power in a main scanning direction.

6. The optical scanning apparatus according to claim 1, wherein
the synchronization detecting unit includes at least one reflecting mirror that deflects the light beam deflected by the optical deflector in a main scanning direction, and
the reflecting mirror and the photodetector are in a virtually conjugate relation in a sub scanning direction.

7. The optical scanning apparatus according to claim 6, wherein the reflecting mirror is arranged immediately after a scanning lens closest to the photodetector.

8. The optical scanning apparatus according to claim 1, wherein the light beam input to the photodetector is focused in a main scanning direction and not focused in a sub scanning direction.

9. An image forming apparatus comprising an optical scanning apparatus, the optical scanning apparatus including:
a plurality of light sources each of which emits a light beam to scan a corresponding one of a plurality of scan target surfaces;
an optical deflector having a plurality of deflecting-reflecting surfaces, the light beams from the light sources being reflected by different deflecting-reflecting surfaces;
a plurality of scanning optical systems each of which focuses a corresponding one of the light beams onto a corresponding one of the scan target surfaces, the light sources being arranged on same side of optical axes of all the scanning optical systems; and
a plurality of synchronization detecting units, each of which detects a synchronization signal regarding one of a start point and an end point of scanning with one of the light beams on one of the scan target surfaces, wherein
one of the synchronization detecting units detects the synchronization signal by receiving a light beam that is deflected by the optical deflector toward a side, which is the same as the side on which a corresponding one of the light sources is arranged, of a corresponding one of the optical axes of a corresponding one of the optical scanning systems, another of the synchronization detecting units detects the synchronization signal by receiving a light beam that is deflected by the optical deflector toward a side, which is opposite to the side on which a corresponding one of the light sources is arranged, of a corresponding one of the optical axes of a corresponding one of the scanning optical systems, and each of the synchronization detecting units includes a photodetector that detects the synchronization signal, each photodetector being arranged on a side, which is opposite to the side on which the light sources are arranged, of a corresponding one of the optical axes of a corresponding one of the scanning optical systems.

10. The image forming apparatus according to claim 9, further comprising at least four latent-image holding units as the scan target surfaces.

* * * * *